Figure 4:
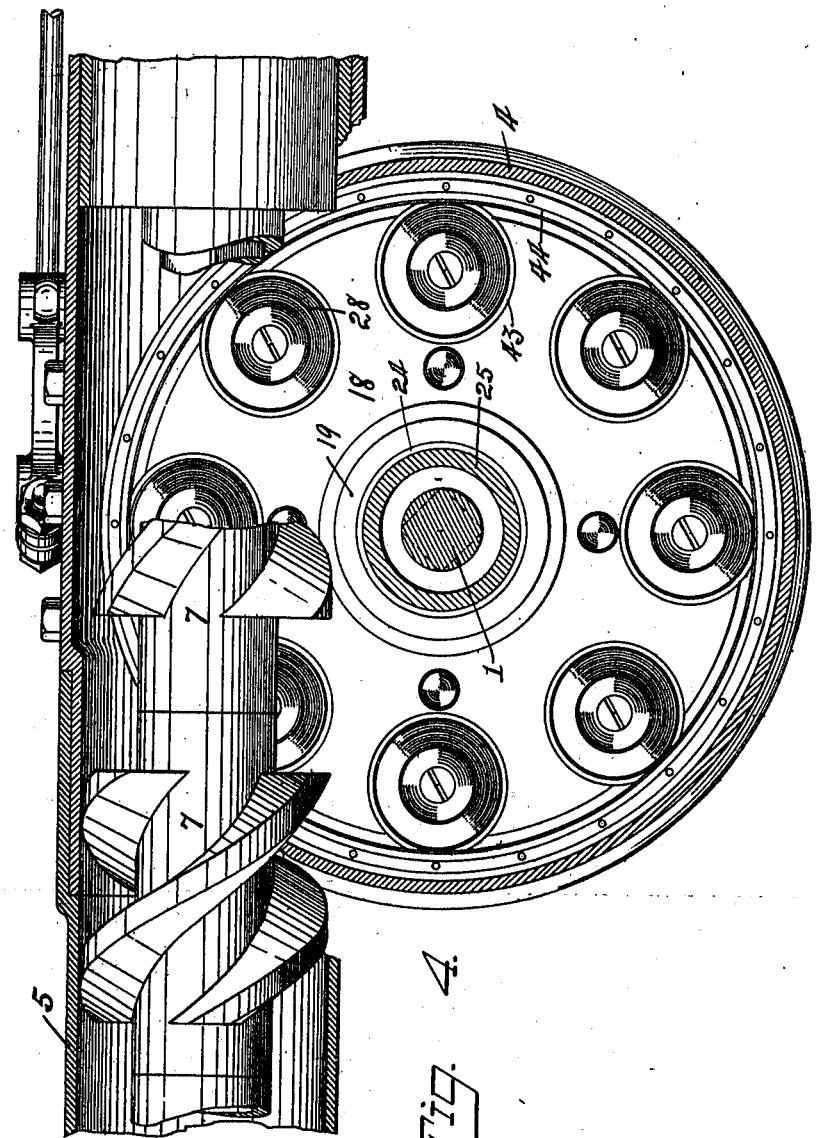

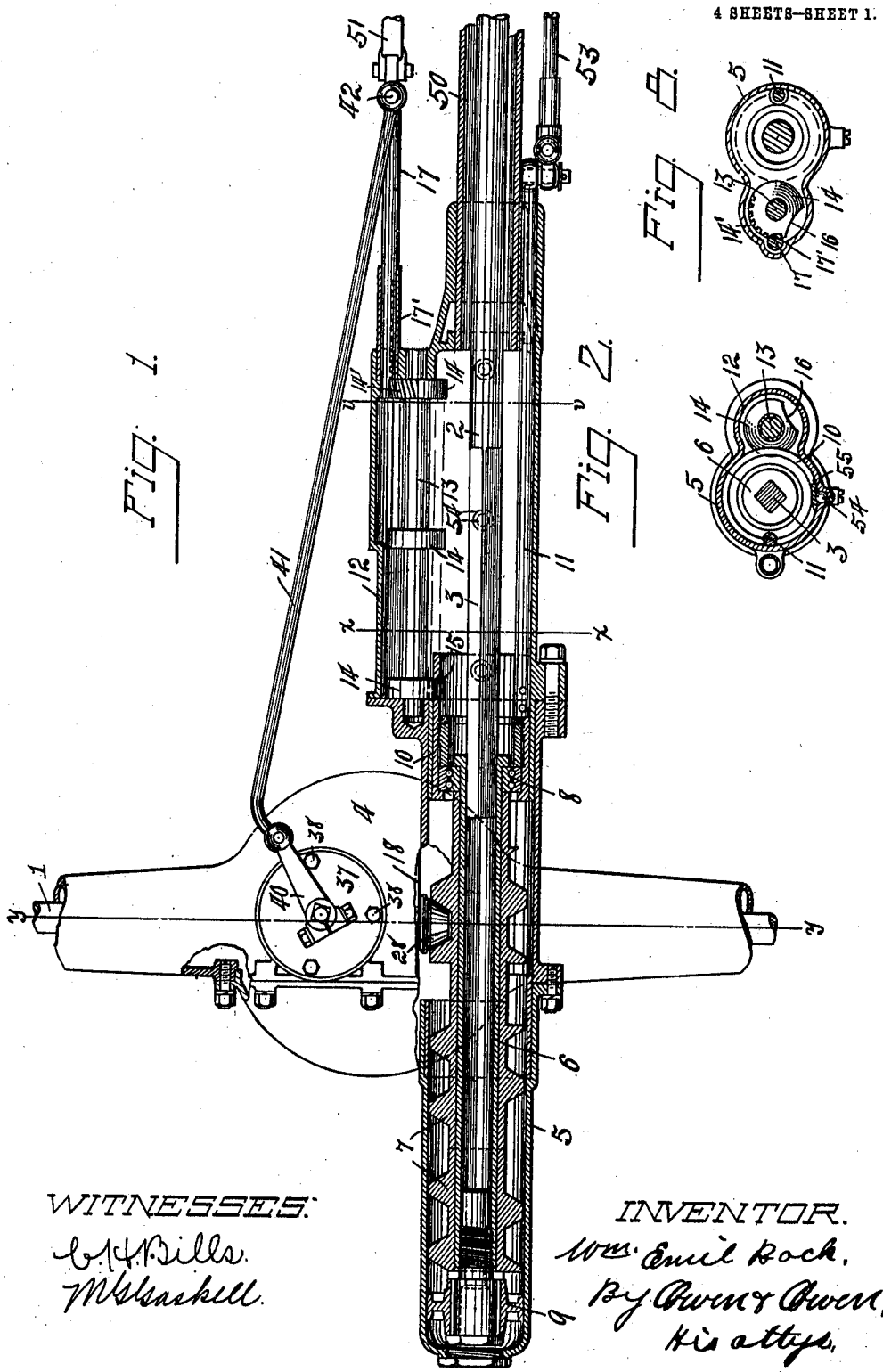

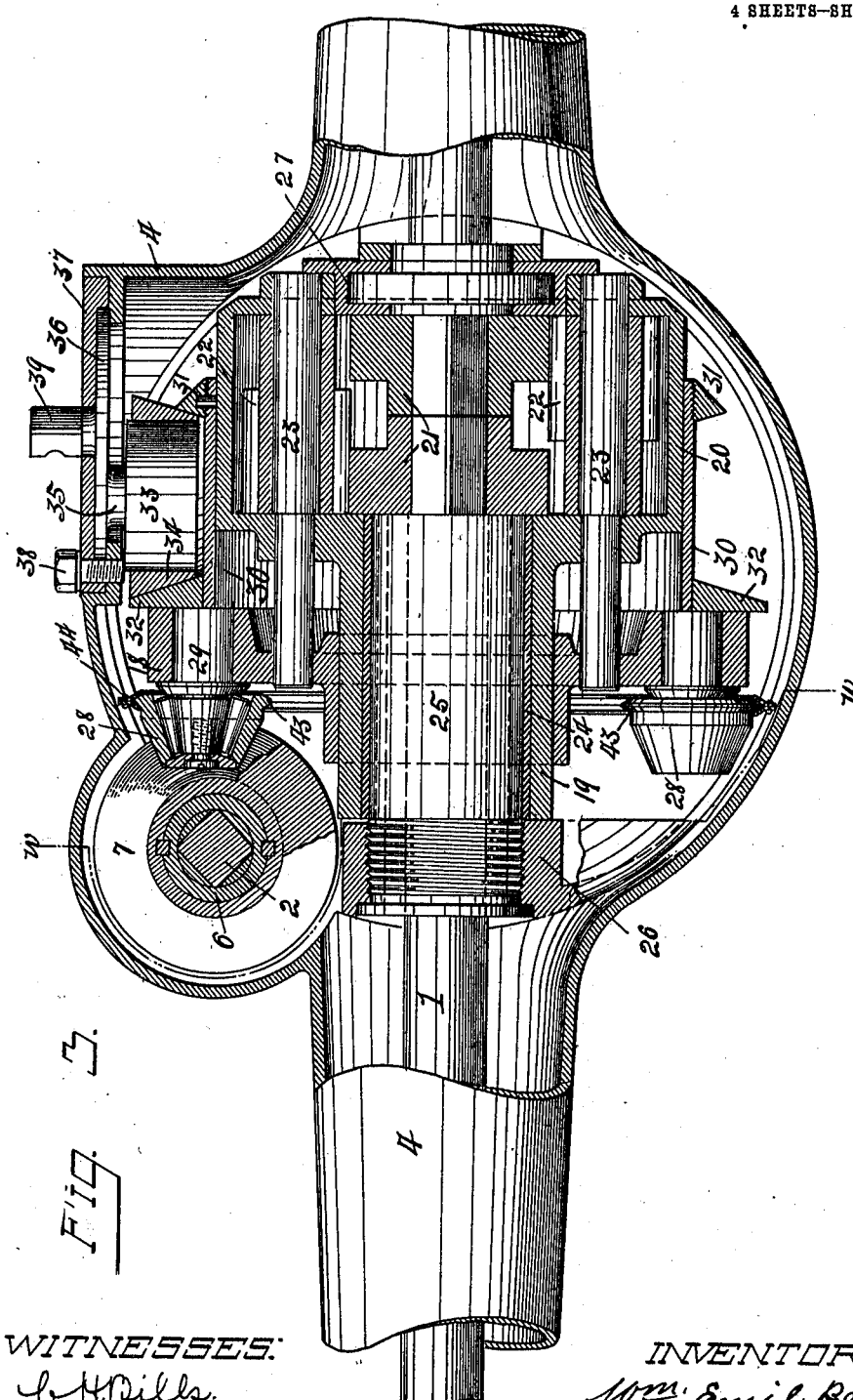

W. E. BOCK.
POWER TRANSMISSION MECHANISM.
APPLICATION FILED DEC. 19, 1910.

990,100.

Patented Apr. 18, 1911.
4 SHEETS—SHEET 3.

WITNESSES:

INVENTOR.
Wm. Emil Bock,
By Owen & Owen,
His attys.

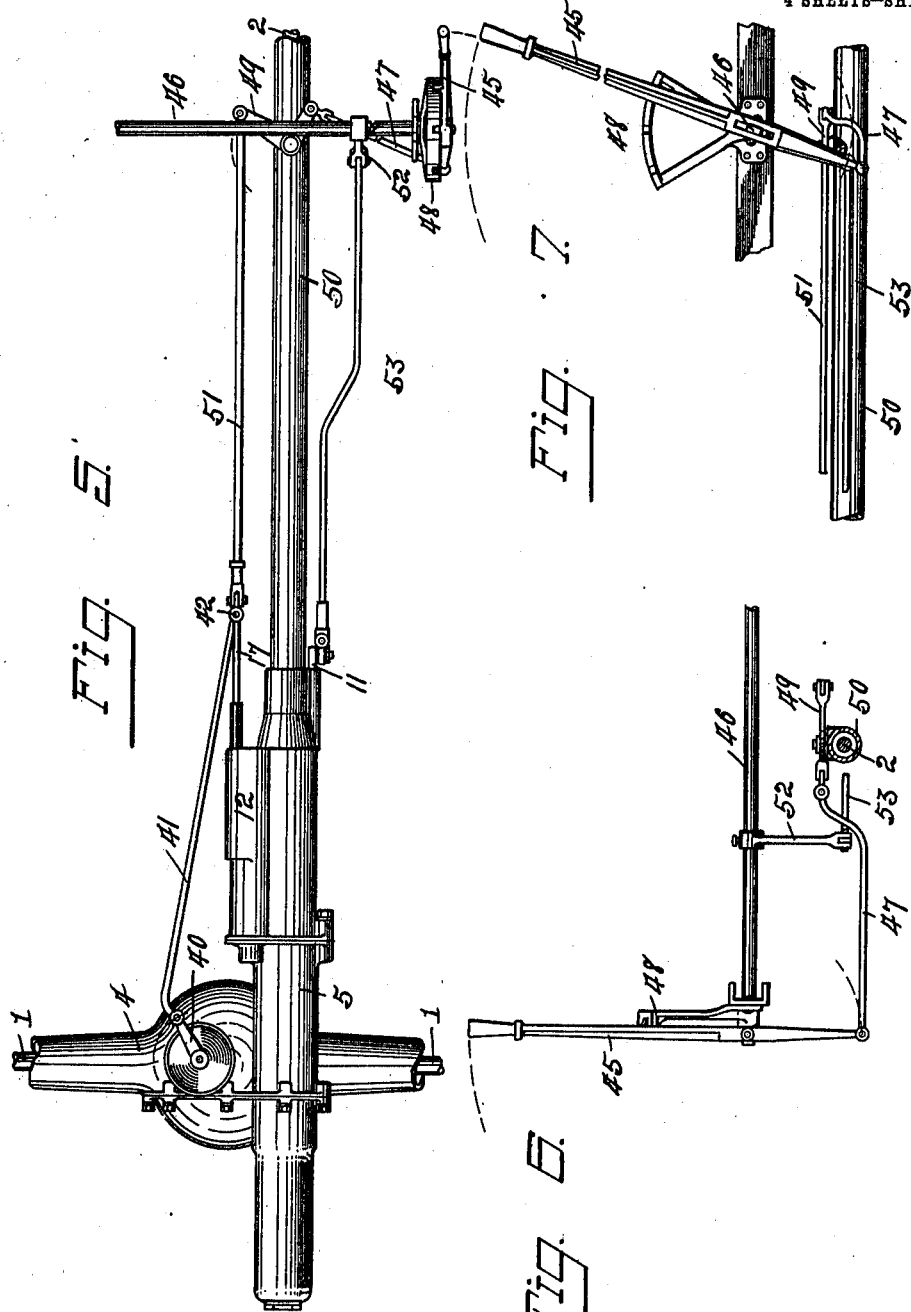

UNITED STATES PATENT OFFICE.

WILLIAM EMIL BOCK, OF TOLEDO, OHIO.

POWER-TRANSMISSION MECHANISM.

990,100.

Specification of Letters Patent. Patented Apr. 18, 1911.

Application filed December 19, 1910. Serial No. 598,173.

*To all whom it may concern:*

Be it known that I, WILLIAM EMIL BOCK, a citizen of the United States, and a resident of Toledo, in the county of Lucas and State of Ohio, have invented a certain new and useful Power-Transmission Mechanism; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to mechanism for the transmission of power at various speeds or in different directions to a driven member from a driving member which is continuously driven in one direction at uniform speed, and while particularly designed for use on automobiles, may be used on power boats, or in any other connection for which it may be adapted.

The object of my invention is to improve upon and simplify the types of transmission mechanisms described and claimed in my former United States patent applications Serial Nos. 533,812, 551,704 and 563,730, filed December 18, 1909, March 26, 1910 and May 27, 1910, respectively, whereby to cheapen the construction and enhance the efficiency, practicability and commercial value thereof.

A further object of my invention is to provide a neater and more compact arrangement of the parts of mechanisms of this character than has heretofore been attained.

The invention is fully described in the following specification, and while in its broader aspect, it is capable of embodiment in numerous forms, a preferred embodiment thereof is illustrated in the accompanying drawings, in which,—

Figure 1 is a plan of the mechanism comprising my invention with parts broken away and in section. Fig. 2 is a cross-section on the line *x x* in Fig. 1. Fig. 3 is an enlarged section on the line *y y* in Fig. 1, with parts in full. Fig. 4 is a section on the line *w w* in Fig. 3 with a part broken away. Fig. 5 is a plan of the mechanism and associated operating parts. Figs. 6 and 7 are different details of the operating or control parts thereof, and Fig. 8 is a cross-section on the line *v v* in Fig. 1.

Referring to the drawings, 1 designates the driven shaft of the mechanism, which, in the present instance, is the driving axle of a vehicle, and 2 the drive shaft, which has its rear or free end portion preferably squared, or of other form in cross-section, as shown at 3, for the purpose hereinafter described. A case or housing 4 incloses the axle 1 and a part of the power transmitting parts, and has a transversely disposed cylindrical case or magazine 5 mounted on the top thereof in longitudinal register with the drive shaft 2 to adapt it to receive the rear end of such shaft.

Mounted longitudinally within the case or magazine 5 is a hollow shaft 6, which has a plurality of worm sections 7 keyed thereto and is mounted at its front and rear ends in suitable bearing parts 8 and 9, respectively, which are mounted for longitudinal movements within said magazine, as shown. The worm-sections 7 are axially shiftable in unison by a longitudinal movement of the shaft 6 to selectively place them in mesh with a driven member 18, and have their threads of the same axial pitch but of different lead to adapt them to communicate varying speeds of rotation to the driven member or reverse rotation thereto from a continuous rotation in one direction of the shaft 6 at uniform speed. While only three worm-sections are shown in the drawings it is evident that any desired number of the same may be used, and that the number of threads of the sections may be varied as the speed desired may require. The rear or squared end 3 of the drive shaft 2 has a sliding fit within the adjacent end of the shaft 6, the hollow of which corresponds in cross-section to the drive shaft end 3 to cause the shafts 2 and 6 to rotate in unison, but permitting free relative longitudinal movements thereof.

The front bearing 8 for the shaft 6 is shown as having an incasing barrel 10 for longitudinal movements therewith within the magazine 5, which barrel has its front end extended beyond the bearing 8, and attached to such extended end is a control-rod 11. This rod parallels the shaft 2 and has its forward end working through and projected without the forward end of the magazine, where it attaches to the control parts hereinafter referred to.

A housing or chamber 12 is provided at one side of the forward end portion of the magazine in lateral communication therewith, and mounted longitudinally of this chamber in parallelism with the drive shaft 2 is a shaft 13, which has its ends rotatably mounted in the ends of the chamber 12 and carries a plurality of spaced disks or members 14. These disks or members correspond in number to the worm sections 7 and are spaced to correspond to the spacing of the centers of such sections. The members 14 are intended to lock with the barrel 10 of the front worm-shaft bearing to secure such shaft in any one of its positions of adjustment, and for this purpose the barrel is provided in the side thereof adjacent to the shaft 13 with a socket or notch 15 with which a registering disk 14, when in one position of its rotary movement, interengages, as indicated in Figs. 1 and 2. The disks 14 are notched in registering order on an edge thereof, as at 16, Fig. 2, to permit a longitudinal movement of the barrel 10 and attached parts when the disks 14 are turned with the notches 16 thereof in register with the barrel notch 15, as is apparent.

To effect rotary movements of the shaft 13 to move the respective disks 14 into or out of locking engagement with the barrel notch 15, a rod 17 is mounted for limited longitudinal reciprocatory movements within the forward end portion of the chamber 12 and has teeth 17' thereon in mesh with a spirally toothed portion 14' of the forward disk 14, as shown in Figs. 1 and 8 for imparting rotary movements to the shaft 13 and its disks 14 when the rod 17 is reciprocated.

The driven member or gear 18 of the mechanism is mounted for axial sliding movements upon the hub portion 19 of a cylindrical case 20, in which the differential mechanism for the driving axle 1 is disposed. This differential mechanism is shown in the present instance as comprising the two relatively rotatable gears 21, 21, which are fixed on the contiguous inner ends of the split axle 1, and the revolving gears 22, which are arranged around the gears 21 and alternately mesh therewith. The gears 22 are mounted on spindles or shafts 23, which journal at their ends in the sides of the case 20 and have the ends thereof adjacent the member 18 projected loosely through the web portion thereof as shown, whereby the member 18 remains in continuous engagement therewith during its shifting movements. The hub portion 19 of the case 20 is rotatably mounted upon a bearing sleeve 24, which is in turn carried by a hollow stub shaft 25 that is threaded into a part 26 of the case 4 and has the axle 1 loosely projected therethrough. The other end of the case 20 has a suitable bearing, as at 27, upon the adjacent portion of the axle.

The gear or member 18 carries a plurality of conical shaped rollers 28 on the side thereof adjacent the worms 7 for meshing with a registering one of such worms whereby motion may be communicated from the roller shaft to the member 18. The rollers 28 are shown in the present instance as having roller bearings upon spindles 29 projecting from the member 18.

Projecting from the side of the member 18 opposed to the rollers 28 is an annular flange 30 which works over and has a sliding bearing on the differential case 20. Surrounding the outer and inner edges of the flange 30 are the annular shoulders or flanges 31 and 32, respectively, which have their adjacent sides oppositely beveled and coöperate to form an annular race for a thrust roller 33, the peripheral portion of which is shaped to fit the walls of such race or provided with a collar 34 of suitable shape for such purpose. The roller 33 is carried by a spindle 35, which projects inwardly from a disk 36 at one side of its axis, which disk is mounted for rotary movements within the upper portion of the case 4, being held to its seat in such case by a removable plate 37, which plate is secured in position by screws 38. The roller 33 is disposed in proper position to oppose the thrust of a worm section against the teeth or rollers 28 of the member 18, and is adapted, upon a turning of the disk 36 in one direction when the member 18 is in mesh with the worm section, to effect a movement of such member to retract it from worm engaging position, and, upon a turning of the disk in the opposite direction when the member 18 is retracted, to effect a movement of the member 18 into position for its teeth to mesh with the registering worm section. The disk 36 has an axial stud 39 projecting outwardly therefrom through the plate 37 and carrying a crank arm 40 without such plate, as shown in Figs. 1, 4 and 5. A link or rod 41 is pivotally connected at one end to the outer end of the crank arm 40 and at its other end to the rod 17, as at 42 (Figs. 1 and 5), whereby the rod 17 and crank arm 40 have their respective movements in unison.

It is found in practice that the passing of the rollers 28 of the gear 18 through lubricating oil in the case 4 causes a material retarding of the rotation of the rollers upon their spindles intermediate the points of contact thereof with the registering driving worm 7, thus causing considerable wear on the coacting surfaces of the rollers and worms due to a relative slipping of the same, which slipping occurs when a roller moves into contact with the worm and until the speed of the roller has been raised to the driving speed of the worm section. To overcome this the rollers 28 of the member 18 are connected together in a suitable manner to cause them to rotate in unison at uniform speed, as by providing each with a conical ridge or shoulder 43 at its inner or large end and encircling all of the rollers with a ring or band 44, the inner surface of which is fashioned to seat over the conical shoulders 43 of the rollers to effect a uniform driving of the same. This feature, however, forms no part of my present invention.

While it is possible to control the movements of the worm sections 7, rod 17 and gear shifting disk 36 in numerous ways, a simple manner of accomplishing this is illustrated in the drawings and will now be described. A control lever 45 is carried at one end of the shaft 46, which shaft is journaled in the vehicle frame, and is pivoted to such shaft for oscillatory movements longitudinally thereof. The lower end of the lever 45 is projected below the shaft 46 and has universal connection with an end of a thrust rod 47. When the lever 45 is swung outwardly from the associated notched segment 48, the longitudinal movement imparted to the rod 47 effects a rocking of a bell-crank lever 49 to one end of which it attaches. The bell crank lever 49 is pivoted, in the present instance, to a case 50 inclosing the forward end portion of the drive shaft 2, and the arm thereof opposed to that to which the rod 47 is attached is connected by a rod 51 to the forward end of the rod 17. It is thus apparent that an outward rocking of the lever 45 from its segment will rock the bell crank lever 49 in a direction to impart rearward movement to the rod 51. Upon such movement of the rod 51 the attached rod 17 is moved to coact with the meshing disk 14 to effect a turning of the shaft 13 and attached disks 14 whereby to move the notches 16 of said disks into register with the notch 15 of the bearing barrel 10 to permit a longitudinal movement of such barrel and attached parts within the magazine 5. The rearward movement of the rod 51 also imparts movement to the rod 41 in unison with that of the rod 17, whereby to move the crank arm 40 and attached disk 36 to effect a shifting of the thrust roller 33 in a direction to retract the gear 18 from worm meshing position, thus leaving the worm sections 7 free to be moved longitudinally within the magazine 4. The shaft 46 has an arm 52 projecting therefrom and this arm is connected by a rod 53 to the forward end of the rod 11 which rod is attached at its rear end to the bearing barrel 10 within the magazine 4. It is thus apparent that a rocking of the control lever 45 transversely of the shaft 46 when moved outwardly from the segment 48, as above described, will effect a movement of the bearing 8 and associated worm sections 7 to selectively place such worm sections into register with the gear 18. The worm sections having been shifted to proper position, the control lever 45 is thrown inwardly into engagement with the registering notch in the segment 48, thus effecting a rocking of the bell crank lever 49 to move the rod 17 to turn the locking disks 14 so that the one in register with the notch 15 in the bearing barrel 10 will interlock therewith to secure the worm sections in shifted position, and the rod 41 will be moved to move the gear shifting roller 33 in the proper direction to shift the driven gear 18 from neutral to worm engaging position, such as shown in Fig. 3. It is thus evident that I have provided a simple single lever control mechanism for my improved power transmission mechanism.

The notches 16 are so positioned on the locking disks 14 that the same are not moved into position to release the coacting bearing barrel 10 until the shifting roller 33 has been turned a sufficient distance to retract the driven gear 18 to neutral position, thus preventing any possible shifting movement of the worm sections within the magazine 4 until the teeth or rollers 28 of the gear 18 have been moved free from engagement therewith. While the gear shifting roller 33 may be positioned at any point around the gear flange 30, it is found quite important in practice that this roller be placed in a position to oppose the outward thrust tendency of the member 18 at the point of engagement of its teeth with a worm section, thus causing the roller 33 to serve both as a thrust roller for maintaining the gear teeth in firm engagement with a worm section and as means for shifting the gear 18 from neutral to gear engaging position or vice versa. The locking disks 14 are so spaced that the worm sections can only be locked against shifting movements within the magazine 4 when a worm section is in position to mesh with the driven gear 18 upon a shifting of the same from neutral position.

To facilitate a stopping of the worm sections at predetermined points in a shifting movement thereof, a plurality of spring pressed detents 54 are mounted in one side of the magazine 5 and spring into a socket 55 in the barrel 10 as the barrel moves thereover, the socket and detents being so arranged that one of the latter will spring within the socket when the respective worm section is in proper register with the driven member 18, as is apparent.

I wish it understood that my invention is not limited to any specific construction or arrangement of the parts except in so far as such limitations are specified in the claims.

Having thus described my invention, what I claim as new and desire to secure by Letters Patent, is,—

1. In a transmission mechanism, the combination of a driven member, a plurality of worm sections shiftable relative to the driven member to selectively place the same in position to mesh therewith, and means operative to shift the driven member relative to the coacting worm section and to act thereon to oppose the thrust action of a meshing worm thereon.

2. In a power transmission mechanism, the combination of a driven member, a drive shaft, worms axially slidable upon such shaft and driven thereby, and means for shifting the driven member to move it into and out of mesh with a registering worm and coacting with the member to resist the worm thrust thereon.

3. In a power transmission mechanism, the combination of a driven member, a plurality of worm sections axially shiftable in unison to selectively place the same in member meshing position, and means operative to lock and release the worm sections, to shift said member into or out of mesh with a worm section, and to oppose the worm thrust on said member.

4. In a power transmission mechanism, the combination of a driven member, a worm for meshing with such member, and a thrust roller for acting on said member to oppose the worm thrust thereon and movable to move said member into or out of mesh with the worm.

5. In a power transmission mechanism, the combination of a driven member having an annular race, a plurality of worm sections which are shiftable to selectively mesh with such member, and means working in said race and operative to move said member to neutral or worm meshing position.

6. In a power transmission mechanism, a driven member having an annular race, a plurality of worm sections shiftable to selectively mesh with said member, and a member controlling part working in said race and operative to move the member to neutral or worm meshing position, said part also acting to oppose the worm thrust on said member.

7. In a power transmission mechanism, the combination of a driven member, a plurality of worms movable to selectively mesh with said member, a rotatable part, a roller carried by and movable with said part and adapted to act on the driven member to move it into or out of worm meshing position.

8. In a power transmission mechanism, a driven member, a plurality of worm sections shiftable to selectively mesh with said member, crank means associated with said member and having a part coacting therewith and movable by a turning of said means to move said member into or out of worm meshing position, and control means attached to said crank means.

9. In a power transmission mechanism, a driven shaft, a differential mechanism on such shaft, at least one drive worm, a driven member slidingly movable relative to the differential mechanism to place it into or out of engagement with such worm, and roller means acting on said member to shift the same.

10. In a power transmission mechanism, a drive member, a driven shaft, a differential mechanism mounted upon such shaft, a driven member mounted at a side of the differential mechanism for axial movements relative thereto, a flange projecting from the driven member around the differential mechanism and coöperating with other parts of said member to form an annular race, and means working in such race and movable to effect a shifting of the driven member from neutral to driving position or vice versa.

11. In a power transmission mechanism, the combination of a driven member, a plurality of drive gears shiftable to selectively mesh with the driven member, means for locking said gears in shifted position and mechanism for moving said locking means to permit shifting movements of the gears and simultaneously moving the driven member to neutral position or vice versa.

12. In a power transmission mechanism, a driven member, a plurality of drive gears axially movable to selectively mesh with said member, a part movable with said gears, rotary means located at a side of the path of movement of said part and movable to lock the same in adjusted position, and control means having a part movable to coact with said locking means to effect locking or releasing movements thereof.

13. In a power transmission mechanism, the combination of a driven member, axially shiftable drive means therefor, a part shiftable with such drive means, a shaft located at one side of the path of shifting movement of such part and having a plurality of spaced parts capable of coacting with said part to secure the same in adjusted position, and means operative to control the locking and releasing movements of said shaft.

14. In a power transmission mechanism, the combination of a driven member, a plurality of worm sections shiftable to selectively mesh with said driven member, a shaft mounted at one side of the path of movement of said worm sections and having parts movable therewith to effect a locking of the worm sections in adjusted position, and means operative to move such shaft to control the worm locking and releasing movements thereof.

15. In a power transmission mechanism, a driven member, a plurality of worm sections axially shiftable to selectively mesh with said member, means for driving said worm sections, means for shifting said sections, a shaft mounted for rotary movements at a side of the path of movement of such sections, means movable by a movement of said shaft to lock the worm sections in adjusted position or release the same, and means for controlling the movements of such shaft.

16. In a power transmission mechanism, a driven member, a magazine at one side of such member, variable speed drive means axially shiftable in said magazine to selectively mesh with said driven member, a part shiftable with said means, means rotatably mounted with its axis at a side of the path of movement of said part and rotatably movable to coact with said part to lock it in shifted position or to release the same, and means for controlling the locking and releasing movements of said rotary locking means.

17. In a power transmission mechanism, the combination of a driven member, a magazine located at one side of said driven member, variable speed drive means axially shiftable in said magazine to selectively mesh with said driven member, a part movable with said drive means in its shifting movements, a shaft mounted at one side of the path of movement of said part, locking disks carried by said shaft and adapted when in one position of the rotary movements with the shaft to selectively coact with said part to lock the same in shifted position and when in another position of their rotary movements to permit free shifting movements of such part, and means operative to effect rotary movements of said shaft to impart locking or releasing movements to said disks.

18. In a power transmission mechanism, the combination of a driven member, a plurality of worms axially shiftable to selectively mesh with said driven member, a magazine guiding the movements of such worms, a part movable with said worms in their shifting movements, rotary means at a side of such magazine for coöperating with said part to lock the same in shifted position, and mechanism operative to rock said rotary means to disengage said part and simultaneously move the driven member to neutral position or vice versa and to effect shifting movements of the worm sections.

In testimony whereof, I have hereunto signed my name to this specification in the presence of two subscribing witnesses.

WILLIAM EMIL BOCK.

Witnesses:
C. W. OWEN,
E. E. THOMAS.